United States Patent [19]

Swartzfager

[11] 4,046,299

[45] Sept. 6, 1977

[54] GLASS CUTTING METHOD

[76] Inventor: John G. Swartzfager, 9381 SW. Taylor, Portland, Oreg. 97225

[21] Appl. No.: 693,645

[22] Filed: June 7, 1976

[51] Int. Cl.² .................................................. B26F 3/08
[52] U.S. Cl. .................................... 225/3; 30/164.95; 83/7; 83/12
[58] Field of Search ............ 83/6, 12, 7; 225/2, 225/3, 96.5, 96; 30/164.95

[56] References Cited

U.S. PATENT DOCUMENTS 1,750,913   3/1930   Vollm .................................. 225/965
3,490,503   1/1970   Hill et al. ............................ 225/3 X Primary Examiner—Willie G. Abercrombie
Attorney, Agent, or Firm—James D. Givnan, Jr.

[57] ABSTRACT

A glass cutting tool having arms offset from the head portion of the tool and engageable with the sides of a tubular workpiece. A cutting element on the tool head is constrained for linear passage along the workpiece by at least one of the arms. Provision is made for extension or retraction of the arms relative to the tool head while additional provision is made for varying the effective distance between an arm and the cutting element. A method is also disclosed for the cutting of glass tubes.

2 Claims, 6 Drawing Figures

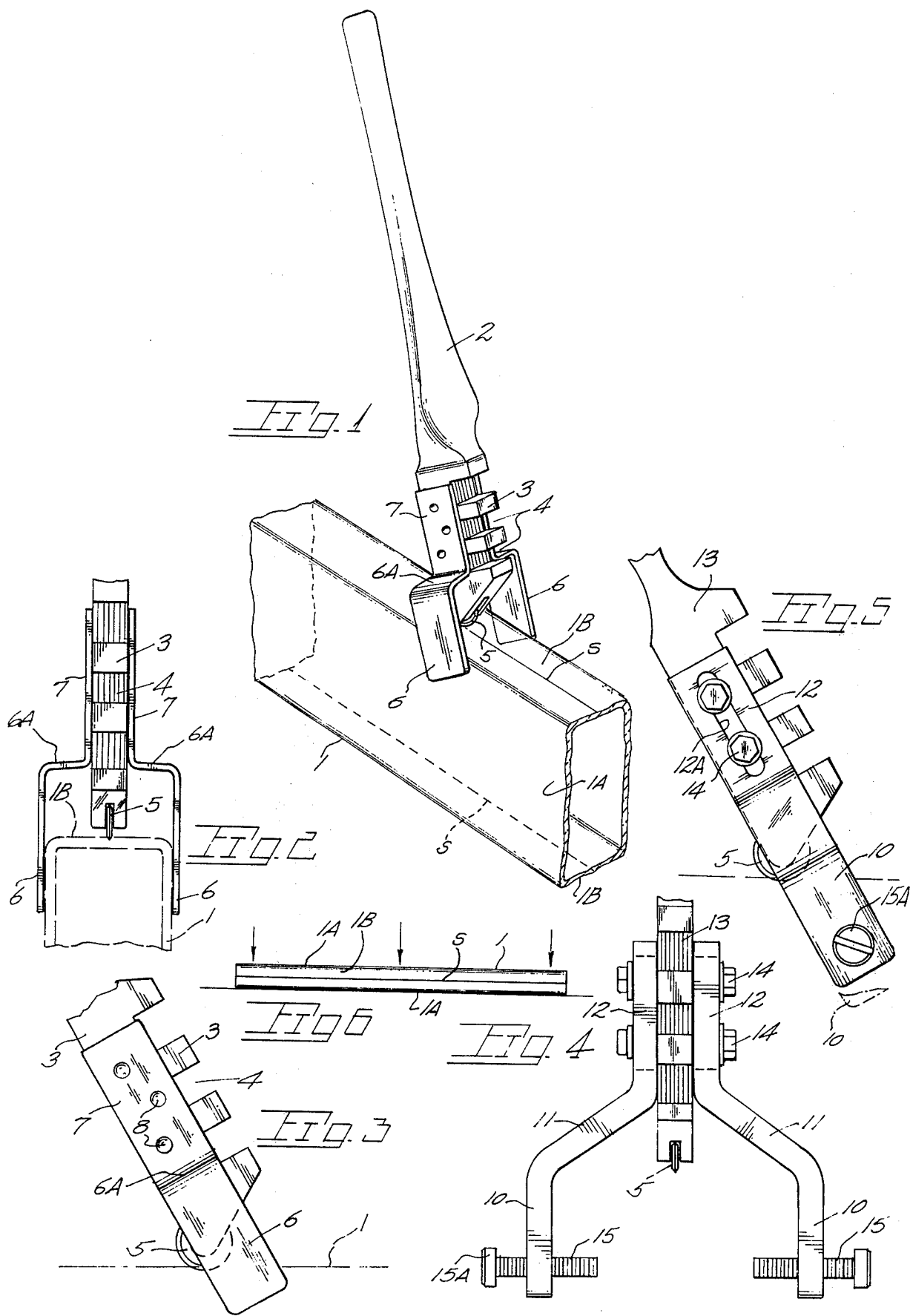

GLASS CUTTING METHOD

BACKGROUND OF THE INVENTION

The present invention relates generally to glass cutting equipment and method particularly for the cutting of glass tubes.

Currently in use are various types of tools and equipment for cutting glass tubes such equipment including diamond or tungsten carbide cutting wheels while other equipment utilizes a wire cutting element used in conjunction with a slurry. Later developments have utilized lasers for cutting. A common drawback to glass tube cutting equipment is their complexity resulting in such equipment being expensive, costly to operate and, in some instances requiring considerable power for operation. Other drawbacks reside in high breakage rates during cutting and loss of material by reason of sizeable kerfs. Glass articles when severed by sawing are more susceptible to cracking when compared with glass articles severed by fracturing. Other drawbacks to sawing or abrading glass articles are the set-up and cutting times involved.

SUMMARY OF THE INVENTION

The present invention is embodied within a glass cutting tool which is drawn along the glass being severed with arms means provided on the tool to locate a tool cutting element.

The arm means project outwardly from the tool head to engage an edge of the glass being cut and thereby space the cutting element from said edge as its drawn over the glass. Said arm means may also include an adjustable member for spacing of the cutting element from the glass edge. Additional provision is made in one form of the invention for adjusting of the arm means in a lengthwise direction of the tool handle to assure proper engagement of the arm means with a wide variety of glass article configurations.

Important objectives achieved by the present invention include: the provision of a glass cutter facilitating the cutting of a glass article in a time saving manner avoiding the use of costly equipment and time consuming setup of the sawing operation; the provision of a glass cutter for cutting glass tubes of various configurations; the provision of a glass cutter of extremely low manufacturing costs; the provision of a glass cutter for tube cutting which permits severing of the glass by cracking leaving edges not susceptible to additional cracking as is the case with abraded edges; and the provision of a method for the rapid severing of glass tube sidewalls for the economical production of glass boats used in various manufacturing processes.

BRIEF DESCRIPTION OF THE DRAWING

In the accompanying drawing:

FIG. 1 is a perspective view of one embodiment of the tool operatively disposed on a glass article;

FIG. 2 is a vertical elevational view of the tool shown in FIG. 1 removed from the glass article and with the tool handle portion broken away;

FIG. 3 is a side elevational view of the tool shown in FIG. 1 with the handle portion broken away;

FIG. 4 is a front elevational view of a modified form of the invention;

FIG. 5 is side elevational view of the modified tool of FIG. 4 shown operatively disposed on a glass article; and FIG. 6 is a side elevational view of a glass tube scribed on its minor sides and subjected to glass severing forces.

DETAILED DESCRIPTION OF THE PREFERRED EMBODIMENTS

With continuing reference to the accompanying drawing wherein applied reference numerals indicate parts similarly identified in the following description, the reference numeral 1 indicates a glass article of tubular configuration. While one specific article configuration is shown it is to be understood that the present invention is applicable to cutting glass articles of various shapes and sizes. The glass tube 1, when cut into halves, forms what are termed quartz slab boats which may be used in integrated circuit oxidation processes.

A handle 2 is of well known glass cutter configuration as is the tool head indicated at 3 which defines multiple inset areas 4 which engage an edge portion of a glass plate during a cracking operation. A cutting element at 5 is shown as a wheel which normally is a tungsten carbide. The foregoing description is of a conventional glass cutter.

In combination with head portion 3 of the glass cutting tool are arms means for the purpose of locating cutter element 5 for travel along a predetermined path to scribe the glass at S. Said arm means includes outwardly projecting arm members at 6 each turned inwardly at 6A toward tool head portion 3. An innermost segment at 7 constitutes an arm base and is affixed to the metallic tool head in a permanent manner as by spot welds at 8.

The tool shown in FIGS. 1, 2 and 3 is intended for use in the cutting of one size of glass tube. Arm members 6 slidably engage the tube sidewalls to locate cutting element 5 for travel along a medial plane of the tube which, when repeated on the remaining side, initiates division of the tube into identical slab boats completed by the application of force to the tube's major sides at 1A.

With attention to FIGS. 4 and 5, a modified form of tool is disclosed again having arm means with outwardly projecting arm members at 10, intermediate arm segments at 11 and innermost arm segments 12. The latter segments are adjustable coupled to head portion 13 of a glass cutting tool by fastener assemblies 14 which extend through elongate openings 12A in arm segments 12. Accordingly, said arm means may be shifted in a lengthwise direction along the tool head to vary the extent to which the arm members 10 project outwardly from said tool head. This feature permits adjustment of the arm means to engage work pieces of different cross-sectional configurations. At the outer end of each arm an adjustable stop at 15 is shown as a threaded shaft with a head 15A for receiving an adjusting tool. Desirably the stops 15 are of a synthetic plastic material to avoid marring of the glass surface when drawn therealong during a cutting operation. The stops 15 may be adjusted uniformly to enable the scribing of a fracture line along a medial plane of the glass article or asymetrically set so as to offset the scribe line from one side or the other of said article.

The method of lengthwise cutting a glass tube into component sections comprises the steps of scribing at S the minor sides 1B a glass tube by drawing of cutter element 5 therealong. Thereafter inwardly directed forces are applied to a central area along one of the major sidewalls 1A to promote full severing of the glass along the two scorings. The tube may be supported on a flat surface during the application of force to a major side or, if size permits, may be held with the force being applied manually. Best results are achieved by the progressive application of force starting at one end of the tube with the strain pattern being such as to severe the glass by applying both tension and compression forces along zones bordering the scribings S and in advance of the area at which pressure is applied. The glass edges, so cut, are less susceptible to breakage than abraded glass edges.

While I have shown but two forms of the invention it will be apparent to those skilled in the art that the invention may be embodied still otherwise without departing fom the spirit and scope of the invention.

Having thus described the invention what is desired to be secured under a Letters Patent is:

1. The method of lengthwise severing a glass tube of rectangular section, said method consisting of the steps of,
    lengthwise scoring the minor sides of the tubular member,
    applying inward pressure to a major side of the rectangular member to impart both tension and compression forces to glass zones located adjacent the lengthwise scorings to separate the glass tube into boat shaped pieces.

2. The method in claim 1 wherein the application of forces to the major side of the tube is done in a progressive manner along the length of a major side.

* * * * *